Oct. 31, 1950   J. R. SCHOONHOVEN   2,527,966
TRAP FOR RATS AND OTHER ANIMALS
Filed July 31, 1947
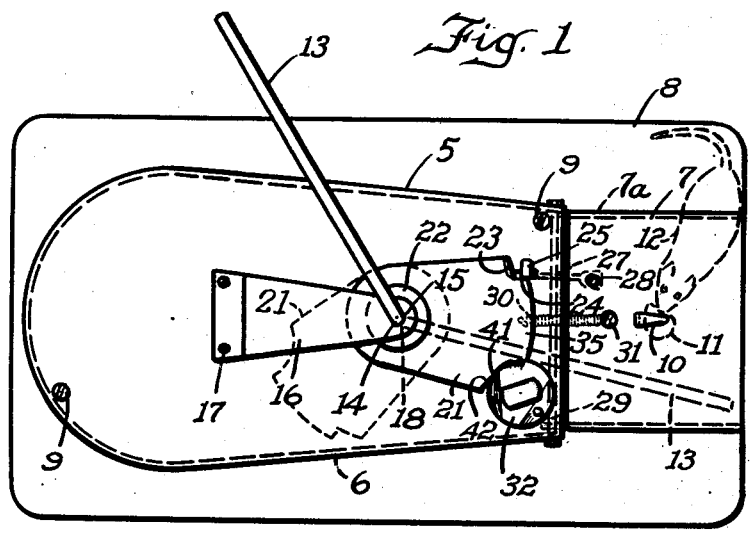
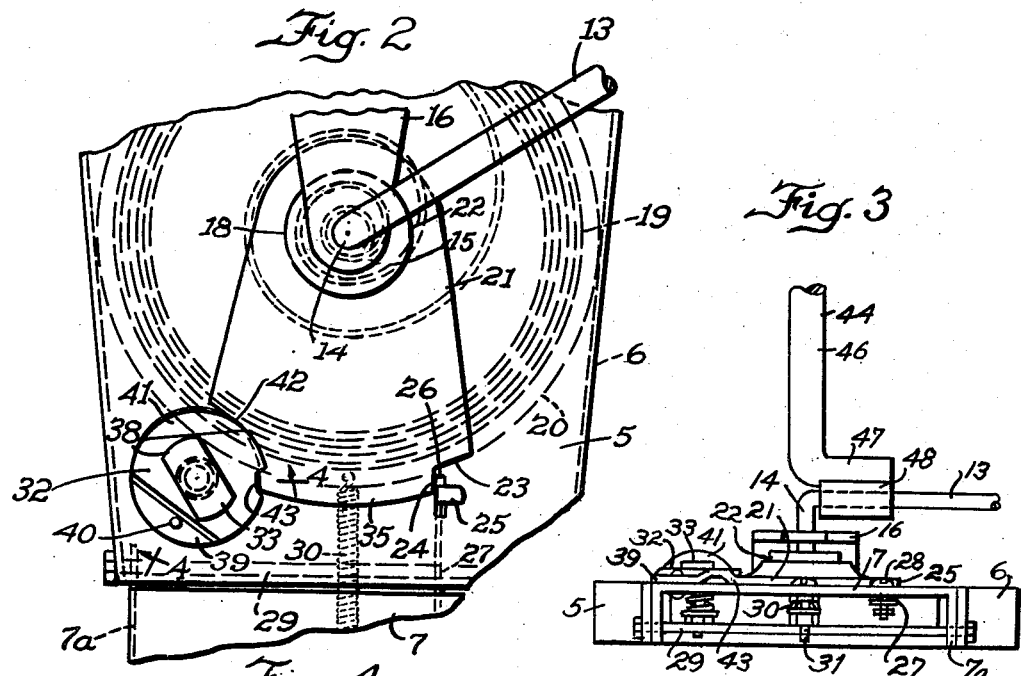
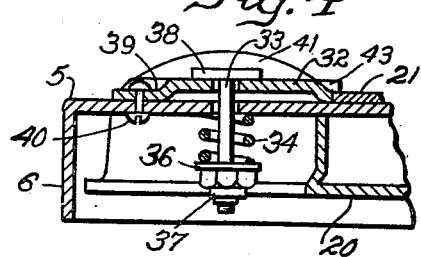
Inventor
Jacob R. Schoonhoven Patented Oct. 31, 1950

2,527,966

UNITED STATES PATENT OFFICE 2,527,966

TRAP FOR RATS AND OTHER ANIMALS

Jacob R. Schoonhoven, Freeport, Ill.

Application July 31, 1947, Serial No. 765,157

11 Claims. (Cl. 43—75)

This invention relates to animal traps and is more particularly concerned with improvements in rat traps of the plural operation, self-resetting type disclosed in my earlier Patent No. 1,463,846.

In traps of the kind mentioned, a spring impelled rotatable striker arm is arranged to swing across a baited trip platform to give the rat or other animal that has sprung the trap a death blow. However, the stop, which locks the striker releasably in cocked position and serves to limit its movement upon each operation of the trap, would be struck with destructive force at the end of the stroke unless some practical form of brake means served to slacken its speed appreciably in the final 30° or more of its movement. It is, therefore, the principal object of my invention to provide a trap of the kind mentioned in which the crank element, of which the striker arm is an integral part, has a segmental plate attached to its axial portion to turn with the striker arm in such a predetermined trailing relationship thereto that the braking action on the segmental plate does not diminish the force of the blow struck by the striker arm, and, what is equally important, the striker arm is held releasably in cocked position far enough away from the trip platform, measured angularly, to insure its attaining the necessary momentum in the region of the trip platform, without, on the other hand, running the risk of too much delay in the arrival of the striker bar at the trip platform and letting the rat escape.

An important feature of my invention is the provision of a brake shoe for slidable contact with the edge portion of the aforesaid segmental plate, the brake shoe being in the form of a stamped sheet metal disk that is pressed down onto the base under the pressure of a coiled compression spring, the compression of which may be adjusted manually by the tightening of a nut on a bolt that extends downwardly through the disk and base and through the coiled compression spring under the base, whereby to compensate for wear after the trap has been in service and accordingly insure continued satisfactory operation of the trap, the segmental plate being flexible and resilient so that its outer end portion tends to spring upwardly away from the base to a small extent but the brake shoe disk being bent to provide an upwardly inclined edge portion to guide the outer end portion of the segmental plate down under the brake shoe disk in the operation of the trap, the segmental plate being, however, free to turn in the opposite direction relative to the brake shoe disk in the winding up of the spiral spring that furnishes the power to swing the striker arm when the trap is sprung.

The invention is illustrated in the accompanying drawing, in which

Fig. 1 is a plan view of a trap made in accordance with my invention;

Fig. 2 is an enlargement of a portion of Fig. 1, showing certain parts in dotted lines under the base and trap platform;

Fig. 3 is an end view of Fig. 1 on a slightly larger scale showing the lower portion of a hand crank applied to the striker bar for the winding up of the operating spring, and Fig. 4 is a sectional detail on the broken line 4—4 of Fig. 2.

The same reference numerals are applied to corresponding parts throughout the views.

Referring to the drawing, the reference numeral 5 designates the sheet metal body or base of the trap which may be of any suitable size and shape, an elongated form like that shown being satisfactory. A peripheral downwardly projecting flange 6 is provided on all sides of the base except on the front end which faces the trip platform 7, and this peripheral flange supports the base 5 in suitably elevated relation to a wooden board or panel 8 onto which the trap is arranged to be suitably fastened, as by means of screws 9 entered through holes provided therefor in the base 5. The panel or board 8 is of a size large enough to afford ample support for the trap and also afford ample frictional resistance to sliding of the trap on the floor so that the user can place the trap at a desired spot with reasonable assurance that it will remain there regardless of the number of rats that may be killed in the one setting. Otherwise, the base 5 is fastened at points 9 by nails or other means directly to the floor of the corn crib or barn in which it is used. The trip platform 7 has a struck-out lug 10 in the center onto which a piece of cheese or other bait may be affixed, as indicated at 11, whereby to insure the positioning of the rat or other animal, indicated in dotted lines at 12, satisfactorily in relation to the striker arm 13 which swings in a counter-clockwise direction across the platform 7, as indicated in dotted lines in Fig. 1, when the trap is sprung by the animal. The arm 13 strikes the rat with sufficient force to insure almost instant death and also throw the body off the platform 7 so that the trap will be reset automatically for the next victim.

The striker arm 13 is the radial arm of a crank element 14 which is mounted for rotation in a hole 15 provided in the outer end of a sheet metal bracket 16 that is fastened by means of screws 17 to the base 5, there being another hole 18 in the base 5 in vertical alignment with the hole 15 in the bracket through which the crank 14 extends for additional bearing support and for connection below the base 5 with the inner end of a spiral spring 19. The outer end of the spring 19 is suitably secured to the peripheral wall of a circular sheet metal housing 20 that encloses the spring 19 and is itself suitably secured to the bottom of the base 5. A segmental shaped sheet metal plate 21 has an enlarged hub portion 22 welded or otherwise suitably secured to the crank element 14 for rotation with the striker arm 13 over the base 5 in the fixed angular relationship to the arm 13 clearly shown in Figs. 1 and 2. One corner of the plate 21 is notched out, as indicated at 23, to define a shoulder 24 which comes into abutment with the stop 25 that projects upwardly from the base 5 through a slot 26 and is preferably formed as an integral part of a link 27 that extends substantially horizontally under the base 5 and under the inner end of the trip platform 7 and is loosely pivotally connected to the platform by means of a pin 28. The trip platform 7 has parallel side flanges 7a that are pivotally connected at their inner ends to the front end of the base 5 on a cross-pin 29, and there is a coiled tension spring 30 attached at one end to the underside of the base 5 and at the other end to a screw 31 extending downwardly from the platform 7, whereby the platform 7 is normally held in raised position with the stop 25 held in operative position for engagement with the shoulder 24 on the plate 21, the spring 30 being connected to the platform 7 in a plane above the level of the pivot pin 29 to urge the platform upwardly and inwardly toward the base. The spring 30, however, is light enough so that very little weight applied to the platform 7, especially at the outer end where the rat or other animal traveling along the wall next to which the trap is set will most likely tread upon the platform, will be sufficient to depress it and thus release the stop 25. Obviously, when the trap is sprung, the arm 13 immediately turns in a counter-clockwise direction under the action of the spring 19, and inasmuch as it travels through approximately 240° before coming into contact with the rat or other animal, there is a sufficient interval for the arm to attain maximum momentum so as to deliver a blow of sufficient force to kill the animal. On the other hand, the angularity of the arm 13 with respect to the plate 21 is fixed so that there will not be too much delay in the arrival of the striker arm at the trip platform to run the risk of letting the rat or other animal escape.

A friction brake shoe 32 is provided to slacken the speed of the plate 21 in the final 30 degrees or more of its movement so that the stop 25 will not be struck with destructive force at the end of the stroke of the striker arm 13. The shoe 32 is in the form of a stamped sheet metal disk which has a bolt 33 extending freely through a hole in the center thereof and freely through a registering hole in the base and then through a coiled compression spring 34 under the base, this spring serving to press the disk 32 down onto the base to exert a yielding frictional resistance to the movement of the plate 21 by slidable engagement with the outer end portion 35 thereof in the final 30 degrees or more of the movement of the striker arm 13, just before the shoulder 24 comes into abutment with the stop 25. A washer 36 is provided under the spring 34 on the bolt 37 and an adjustable nut 37 is threaded on the lower end of the bolt so that the compression of the spring 34 may be adjusted manually by the tightening of the nut to compensate for wear on the disk 32 and plate 21 after the trap has been in service and accordingly insure continued satisfactory operation of the trap. A T-head 38 is provided on the bolt 33 to facilitate holding the bolt against turning when the nut 37 is being adjusted. Now, the disk 32 has a depressed edge portion 39 on that side away from the plate 21 which rests on top of the base 5 and loosely receives a pin 40 carried on the base to prevent turning of the disk during the braking operation. The disk is, furthermore, bent to provide an upwardly inclined edge portion 41 on that side toward the plate 21 to serve as a guide to insure flexing the outer end portion 35 of the plate downwardly under the disk 32 in the final 30 degrees or more of counter-clockwise movement of the striker arm 13 for the braking action. However, although the plate 21 is arranged to be held by engagement under the one edge portion of the disk and against the depressed edge portion 43 of said disk, at the end of each cycle, in the normal automatic operation of the trap, this disk 32 does not block the path of plate 21 in the winding of the spring 19. The reason for this is that in a winding operation the stop is held retracted by depression of trip platform 7, and under those conditions it should be clear that since the plate 21 has to be flexed downwardly in order to ride under disk 32, when turning in a counter-clockwise direction as described above, it will, when moved past the disk 32 in the counter-clockwise movement, spring upwardly at its outer end 35 enough to be disposed above the plane of the disk 32, so that there is nothing to interfere with the clockwise rotation of the plate 21, the only thing standing in its way being the upwardly inclined edge portion 41 over the inclined back of which the plate 21 is adapted to slide freely, the outer end portion 35 of the plate 21 being simply flexed upwardly a trifle as it rides over this projection. Now, the other corner portion 42 of the plate 21 is cut away in an arc as clearly appears in Fig. 2, so that the outer end portion 35 is almost entirely clear of the disk 32 when the shoulder 24 comes into abutment with the trigger 25, there being only a narrow edge portion of the plate 21 adjacent the notch 42 still disposed under the edge portion of the disk 32 at that time so as to hold the outer end portion 35 of the plate down in close contact with the base 5 to insure good contact with the stop 25 at 24, without, however, imposing any appreciable drag on the freedom of movement of the plate 21 such as would interfere with instant functioning of the trap when sprung. A lug 43 is struck downwardly from the edge portion of the disk 32, and engages in the notch 42 at the limit of movement of the plate 21 thereby definitely confining the plate 21 so that the bar 13 cannot move in either direction until the trap is sprung in the manner previously described. The lug 43 scrapes over the edge portion 35 of the plate in the final 30 degrees or so of its movement and snaps down into position in the notch 42 at the same time that the shoulder 24 comes into abutment with the stop 25, and this scraping action of the lug 43 on the edge portion 35 of the plate increases the braking effect.

For the winding of the spring 19, I prefer to provide a hand crank 44, as disclosed in Fig. 3, which has an end portion 46 having a right angle radially bent end portion 47 on which sleeve 48 is welded or otherwise suitably secured adapted to receive the striker arm 13 and be slid inwardly to a position where the end portion 46 of the crank is substantially in coaxial alignment with the crank 14 so that the spring may be wound with minimum effort and the operator can tell from the amount of resistance afforded by the spring when he has wound it sufficiently. At the end of the winding operation, the crank 44 is backed up in a counter-clockwise direction only far enough to bring the shoulder 24 on the plate 21 into engagement with the stop 25 whereupon the crank 44 can be removed from the striker arm 13.

It is believed the foregoing description conveys a good understanding of the objects and advantages of my invention. The appended claims have been drawn to cover all legitimate modifications and adaptations.

I claim:

1. An animal trap comprising a base, a spring motor actuated striker arm rotatably mounted on the base, a segmental plate fixed in a predetermined angular relationship to and turning with said striker arm relative to said base, a positive stop for said plate reciprocable on the base, a trip platform pivoted relative to said base and operatively connected to said stop to release the same, and spring-pressed friction brake means on said base arranged in spaced relation to said stop for slidable frictional engagement with the radially outer edge portion of said plate near the completion of a revolution.

2. An animal trap comprising a base, a spring motor actuated striker arm rotatably mounted on the base, a flexible resilient segmental plate fixed in a predetermined angular relationship to and turning with said striker arm relative to said base, a positive stop for said plate reciprocable on the base, a trip platform pivoted relative to said base and operatively connected to said stop to release the same, a friction brake disc loosely mounted on the base in the path of rotary movement of the radially outer portion of the segmental plate, the radially outer portion of said plate having a leading edge and a trailing edge and said disc having an entrance side and a diametrically opposed exit side in relation to the turning of said plate relative to the disc in the operating direction, and spring means urging said disc against said base to provide a yieldable braking action on the plate when slid therebetween, said disc having an upwardly inclined edge portion on the entrance side under which the outer portion of said segmental-plate when turning in an operating direction is arranged to slide with relatively great friction while flexed downwardly under the under-surface of said disc, the outer portion of said plate being adapted to be flexed upwardly and slide with relatively light friction over said upwardly inclined edge portion when turning in the opposite direction in the winding of the spring motor with said striker arm.

3. A trap as set forth in claim 2, including a downwardly projecting lug on the disc on the exit side arranged to scrape over the top of the outer portion of the segmental plate for a more pronounced braking effect.

4. A trap as set forth in claim 2, including a downwardly projecting lug on the disc on the exit side arranged to scrape over the top of the outer portion of the segmental plate for a more pronounced braking effect, said lug being so spaced in relation to said stop to drop off the trailing edge of the plate at the instant of engagement of the leading edge of said plate with said stop, whereby said plate and striker arm are positively locked in the terminal position until release of the stop.

5. A trap as set forth in claim 2, including a downwardly projecting lug on the disc on the exit side arranged to scrape over the top of the outer portion of the segmental plate for a more pronounced braking effect, said lug being so spaced in relation to said stop to drop off the trailing edge of the plate at the instant of engagement of the leading edge of said plate with said stop, whereby said plate and striker arm are positively locked in the terminal position until release of the stop, said disc being so formed on the exit side in relation to said lug as to overlap a narrow edge portion of the trailing edge of the plate in the terminal position to insure holding the plate down close to the base for more secure engagement with the stop until the release thereof.

6. A trap as set forth in claim 2, including a downwardly projecting lug on the disc on the exit side arranged to scrape over the top of the outer portion of the segmental plate for a more pronounced braking effect, and a manually adjustable means for varying the pressure of the spring means urging the brake disc toward the base, whereby to compensate for wear of the lug and plate.

7. An animal trap comprising a base, a spring motor actuated striker arm rotatably mounted on the base, a segmental plate fixed in a predetermined angular relationship to and turning with said striker arm relative to said base, a positive stop for said plate reciprocable on the base, a trip platform pivoted relative to said base and operatively connected to said stop to release the same, spring-pressed friction brake means on said base arranged in spaced relation to said stop for slidable frictional engagement with the radially outer edge portion of said plate in the completion of a revolution, and a manual adjustment for varying the pressure of the spring means on said brake means whereby to permit compensating for wear on the plate and brake means.

8. An animal trap comprising a base, a spring motor actuated striker arm rotatably mounted on the base, a flexible resilient segmental plate fixed in a predetermined angular relationship to and turning with said striker arm relative to said base, a positive stop for said plate reciprocable on the base, a trip platform pivoted relative to said base and operatively connected to said stop to release the same, a friction brake disc, a bolt extending through said disc and through the base to mount said disc in the path of rotary movement of the radially outer portion of the segmental plate, the radially outer portion of said plate having a leading edge and a trailing edge and said disc having an entrance side and a diametrically opposed exit side in relation to the turning of said plate relative to the disc in the operating direction, means to prevent turning of said disc relative to said base, and a coiled compression surrounding and supported on said bolt in abutment with the underside of the base urging the disc against the base to provide a yielding braking action on the plate when slid therebetween, said disc having an upwardly inclined edge portion on the entrance side under which the outer portion of said segmental-plate when turning in an operating direction is arranged to slide with relatively great friction while flexed downwardly under the undersurface of said disc, the outer portion of said plate being adapted to be flexed upwardly and slide with relatively light friction over said upwardly inclined edge portion when turning in the opposite direction in the winding of the spring motor with said striker arm.

9. A trap as set forth in claim 8 including a manually adjustable nut threaded on said bolt for varying the pressure of the compression spring urging the brake disc toward the base.

10. A trap as set forth in claim 2, including manually adjustable means for varying the pressure of the spring means urging the brake disk toward the base, whereby to permit compensating for wear on the brake disc and the plate.

11. A trap as set forth in claim 2, in which the brake disc is so formed and spaced in relation to the stop to overlap a narrow edge portion of the trailing edge of the plate in the terminal position to hold the plate down close to the base for more secure engagement of the leading edge with the stop until the release thereof.

JACOB R. SCHOONHOVEN.

REFERENCES CITED

The following references are of record in the file of this patent:

UNITED STATES PATENTS

| Number | Name | Date |
|---|---|---|
| 542,963 | Klenge | July 16, 1895 |
| 704,576 | Prior | July 15, 1902 |
| 911,412 | Lang | Feb. 2, 1909 |
| 1,523,375 | Wirtjes | Jan. 13, 1925 |